(12) United States Patent
Taylor et al.

(10) Patent No.: US 9,329,799 B2
(45) Date of Patent: May 3, 2016

(54) BACKGROUND CHECKING FOR LOST WRITES AND DATA CORRUPTION

(71) Applicant: NetApp, Inc., Sunnyvale, CA (US)

(72) Inventors: James Taylor, Livermore, CA (US); Tim Emami, San Jose, CA (US)

(73) Assignee: NetApp, Inc., Sunnyvale, CA (US)

( * ) Notice: Subject to any disclaimer, the term of this patent is extended or adjusted under 35 U.S.C. 154(b) by 0 days.

(21) Appl. No.: 14/196,735

(22) Filed: Mar. 4, 2014

(65) Prior Publication Data

US 2015/0254020 A1    Sep. 10, 2015

(51) Int. Cl.
*G06F 3/00* (2006.01)
*G06F 13/00* (2006.01)
*G06F 11/00* (2006.01)
*G06F 3/06* (2006.01)

(52) U.S. Cl.
CPC .............. *G06F 3/0656* (2013.01); *G06F 3/067* (2013.01); *G06F 3/0608* (2013.01)

(58) Field of Classification Search
None
See application file for complete search history.

(56) References Cited

U.S. PATENT DOCUMENTS

| | | | |
|---|---|---|---|
| 5,341,381 A * | 8/1994 | Fuller | 714/6.12 |
| 7,774,540 B2 * | 8/2010 | Han et al. | 711/112 |
| 8,250,453 B2 * | 8/2012 | Matsushige | 714/819 |
| 8,543,862 B2 * | 9/2013 | Dilman et al. | 714/6.1 |
| 8,595,595 B1 * | 11/2013 | Grcanac | G06F 11/1092 714/6.2 |
| 8,665,545 B2 * | 3/2014 | Coker et al. | 360/53 |

* cited by examiner

*Primary Examiner* — Idriss N Alrobaye
*Assistant Examiner* — Richard B Franklin
(74) *Attorney, Agent, or Firm* — Mahamedi Paradice LLP

(57) ABSTRACT

Examples described herein include a system for storing data. The data storage system stores data in one or more storage locations of a storage drive and generates context information that identifies the data associated with each of the one or more storage locations. The context information is stored in a data buffer, and may include at least one of: an index node, a file block number, or a generation count. Further, the data buffer may be a FIFO circular buffer. The data storage system then uses the context information in the data buffer to verify the data stored in the one or more storage locations during an idle time of the storage drive.

12 Claims, 5 Drawing Sheets

BACKGROUND CHECKING FOR LOST WRITES AND DATA CORRUPTION

TECHNICAL FIELD

Examples described herein relate to computer storage networks, and more specifically, to background checking for lost write and data corruption in a computer storage network.

BACKGROUND

Data storage technology over the years has evolved from a direct attached storage model (DAS) to using remote computer storage models, such as Network Attached Storage (NAS) and Storage Area Network (SAN). With the direct storage model, the storage is directly attached to the workstations and applications servers, but this creates numerous difficulties with administration, backup, compliance, and maintenance of the directly stored data. These difficulties are alleviated at least in part by separating the application server/workstations form the storage medium, for example, using a computer storage network.

A typical NAS system includes a number of networked servers (e.g., nodes) for storing client data and/or other resources. The servers may be accessed by client devices (e.g., personal computing devices, workstations, and/or application servers) via a network such as, for example, the Internet. Specifically, each client device may issue data access requests (e.g., corresponding to read and/or write operations) to one or more of the servers through a network of routers and/or switches. Typically, a client device uses an IP-based network protocol, such as Common Internet File System (CIFS) and/or Network File System (NFS), to read from and/or write to the servers in a NAS system.

In the context of NAS, a storage server may be a file server (e.g., a "filer") which operates on behalf of one or more clients to store and manage shared files in a set of mass storage devices (e.g., magnetic/optical disks or tapes). The mass storage devices may be organized into one or more volumes or aggregates of a Redundant Array of Inexpensive Disks (RAID). In a large scale storage system, it is possible that data may become corrupted or stored incorrectly from time to time. Consequently, RAID schemes include built-in "scrubbing" techniques to detect and, in some cases, to correct corrupted data. However, it may take weeks or even longer to scrub an entire drive. On the other hand, if left uncorrected, data corruption can be propagated to other blocks in a RAID stripe due to subsequent write operations to the same stripe.

SUMMARY

This Summary is provided to introduce in a simplified form a selection of concepts that are further described below in the Detailed Description. This summary is not intended to identify key features or essential features of the claimed subject matter, nor is it intended to limit the scope of the claimed subject matter.

A computer system performs operations that include storing data in one or more storage locations of a storage drive and generating context information that identifies the data associated with each of the one or more storage locations. The context information may include a checksum, an index node, a file block number, and/or a generation count. The context information is stored in a data buffer, and is subsequently used by the computer system to verify the data stored in the one or more storage locations during an idle time of the storage drive.

In an aspect, the computer system stores a block of data in each of the one or more storage locations and generates a particular set of context information for each block of data. Specifically, each set of context information may identify the block of data associated with a respective one of the one or more storage locations. The computer system may store each set of context information in the data buffer upon storing the corresponding block of data in the storage drive. In another aspect, the data buffer is a first-in first-out (FIFO) circular buffer. Accordingly, the computer system may overwrite an oldest entry in the data buffer with a most recent set of context information if the data buffer is full.

In order to verify the data stored in the one or more storage locations, the computer system first detects that the storage drive is idle. For example, the storage drive may be idle as long as no data is being read from or written to the drive. Upon detecting that the storage drive is idle, the computer system reads a first set of context information from the data buffer. In particular, the first set of context information may correspond to an oldest entry in the data buffer. The block of data identified by the first set of context information is then compared with the block of data stored in the storage location associated with the first set of context information.

In an aspect, the computer system may detect a corrupted block of data by comparing the block of data identified by the first set of context information with the block of data stored in the storage location associated with the first set of context information. The corrupted block of data can then be reconstructed using parity information stored in another storage drive. Still further, the computer system may verify one or more blocks of data surrounding the corrupted block of data in the storage drive. The surrounding blocks may be stored in physical and/or temporal proximity to the corrupted block. For example, the surrounding blocks may include other data blocks in the same RAID stripe as the corrupted block and/or in surrounding RAID stripes.

Aspects described herein recognize that data corruption typically occurs during write operations. Thus, maintaining a circular log of the most recently written data blocks enables the computer system to detect corrupted write data early on, while the error is likely to still be correctable. Furthermore, by executing in the background (i.e., verifying write data when the storage drives are idle) and storing only the context information associated with each block of data that is written, the write verification operation can be implemented with low cost and/or little overhead.

DETAILED DESCRIPTION

Figure 1A:
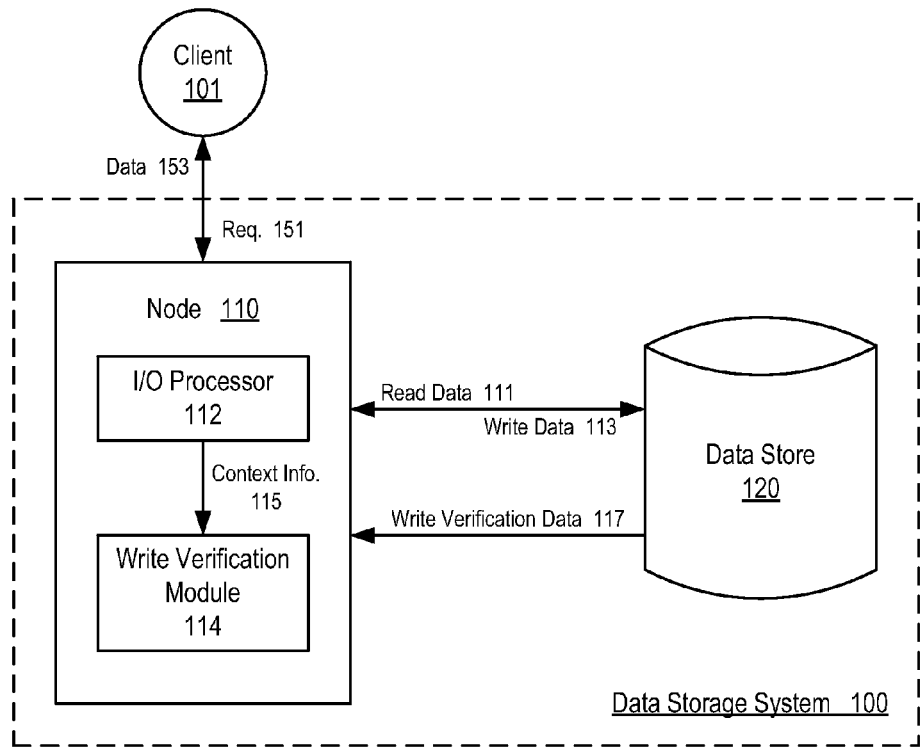
FIG. 1A illustrates a data storage system with background write verification, in accordance with some aspects.

Examples described herein include a computer system to verify recently-written data in a storage drive. In particular, the examples herein provide for a method of detecting and/or correcting corrupted data early on, while the error is likely to still be correctable. In some aspects, the write verification operation is performed as a background task, executing only when the storage drive is idle so as not to interfere with other read and/or write operations being performed on the drive.

As used herein, the terms "programmatic", "programmatically" or variations thereof mean through execution of code, programming or other logic. A programmatic action may be performed with software, firmware or hardware, and generally without user-intervention, albeit not necessarily automatically, as the action may be manually triggered.

One or more aspects described herein may be implemented using programmatic elements, often referred to as modules or components, although other names may be used. Such programmatic elements may include a program, a subroutine, a portion of a program, or a software component or a hardware component capable of performing one or more stated tasks or functions. As used herein, a module or component can exist in a hardware component independently of other modules/components or a module/component can be a shared element or process of other modules/components, programs or machines. A module or component may reside on one machine, such as on a client or on a server, or may alternatively be distributed among multiple machines, such as on multiple clients or server machines. Any system described may be implemented in whole or in part on a server, or as part of a network service. Alternatively, a system such as described herein may be implemented on a local computer or terminal, in whole or in part. In either case, implementation of a system may use memory, processors and network resources (including data ports and signal lines (optical, electrical etc.)), unless stated otherwise.

Furthermore, one or more aspects described herein may be implemented through the use of instructions that are executable by one or more processors. These instructions may be carried on a non-transitory computer-readable medium. Machines shown in figures below provide examples of processing resources and non-transitory computer-readable mediums on which instructions for implementing one or more aspects can be executed and/or carried. For example, a machine shown for one or more aspects includes processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on many cell phones and tablets) and magnetic memory. Computers, terminals, and network-enabled devices (e.g. portable devices such as cell phones) are all examples of machines and devices that use processors, memory, and instructions stored on computer-readable mediums.

FIG. 1A illustrates a data storage system 100 with background write verification, in accordance with some aspects. The system 100 includes a node 110 coupled to a data store 120. Node 110 may correspond to a server on a network that is configured to provide access to the data store 120. It should be noted that the data storage system 100 is shown to include only one node 110 and one data store 120 for simplicity, only, and may include multiple nodes and/or data stores in other aspects. For example, node 110 may belong to a multi-node cluster that is interconnected via a switching fabric. A client terminal 101 may send data access requests 151 to and/or receives data 153 from the data storage system 100 using a network-based protocol such as, for example, Common Internet File System (CIFS) or Network File System (NFS). Each data access request 151 corresponds to a read or write operation to be performed on a particular data volume or storage drive in the data store 120.

Node 110 includes an input and output (I/O) processor 112, which receives the data access request 151 and performs corresponding read and/or write operations on the data store 120. For example, the I/O processor 112 may store write data 113 in the data store 120, in response to a data request 151 specifying a write operation. The I/O processor 112 may also retrieve read data 111 from the data store 120, in response to a data request 151 specifying a read operation. The data store 120 may include a number of mass storage devices (e.g., disk drives or storage drives). For example, data may be stored on conventional magnetic disks (e.g., HDD), optical disks (e.g., CD-ROM, DVD, Blu-Ray, etc.), magneto-optical (MO) storage, and/or any other type of volatile or non-volatile medium suitable for storing large quantities of data.

Node 110 further includes a write verification module 114 to verify or check for errors in recently-written data in the data store 120. For example, the write verification module 114 may store and/or maintain a log or record of write operations performed by the I/O processor 112. In an aspect, the write verification module 114 stores only context information 115 associated with each write operation (and not the actual data to be written). Specifically, each time a block of data is written to the data store 120, the I/O processor 112 generates a set of context information 115 (e.g., metadata) identifying the data being stored at a particular storage location in the data store 120. In some aspects, a copy of the context information 115 is stored along with the write data 113 in a corresponding storage location of the data store 120. The write verification module 114 may verify the recently-written data in the data store 120, for example, by comparing the context information 115 with the actual data stored in the data store 120.

Figure 1B:
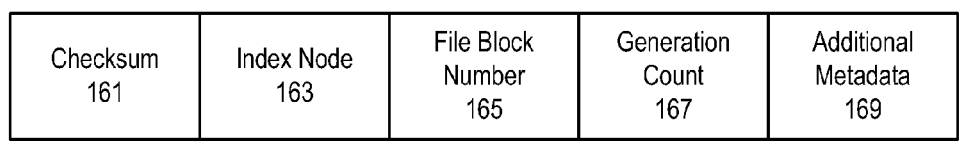
FIG. 1B illustrates an exemplary set of context information which may be used in background write verification operations, in accordance with some aspects.

With reference, for example, to FIG. 1B, a set of context information 160 may include a checksum 161, an index node (inode) 163, a file block number (FBN) 165, a generation count 167, and/or other metadata 169 which may be used to associate a block of data with a particular storage location (e.g., file identifier, volume block number, disk block number, etc.). Specifically, the write verification module 114 may use any number and/or combination of context information to perform write verification. For example, the write verification module 114 can identify the FBN 165 for a recently-written data block and read the corresponding block of data (i.e., write verification data 117) stored at that location in the data store 120. A checksum may then be calculated based on the write verification data 117 and compared with the checksum 161 stored by the write verification module 114 to determine whether the write verification data 117 is corrupted.

Aspects herein recognize that data corruption typically occurs, if at all, during write operations. Thus, recently-written data is more likely to contain errors than older data already stored in the data store 120 for some time. In some aspects, the write verification module 114 stores the context information 115 for only the most recently-written data. For example, the context information 115 may be stored in a first-in first-out (FIFO) circular buffer. Accordingly, the oldest entries in the buffer are the first to be read out. Once all of the storage locations of the data buffer have been written to, newly-generated context information may be stored in place of the oldest entries in the buffer (i.e., in a circular fashion). In some instances, for example where the data buffer is full, the oldest context information stored in the buffer may be overwritten with newer context information (e.g., to ensure that the buffer continuously maintains context information for the most recently written data).

In some aspects, the write verification module 114 performs write verification operations in the background. In other words, the write verification module 114 may compare the context information 115 with corresponding write verification data 117 only when the data store 120 (or one or more storage drives therein) is idle. For example, the write verification module 114 may monitor the I/O processor 112 to determine when data is not being written to or read from the data store 120. In an aspect, the I/O processor 112 may indicate an idle state by asserting or otherwise communicating an idle signal to the write verification module 114.

By maintaining a circular log of the most recently written data, the write verification module 114 may be able to detect corrupted write data 113 early on (e.g., while the error is likely to still be correctable). The circular log requires little hardware overhead to implement, since only the context information 115 associated with each write operation is stored therein. Further, by performing write verification operation in the background (i.e., when the storage drives are idle), the write verification module 114 may check for corrupted write data 113 without hindering the performance of the I/O processor 112.

Figure 2:
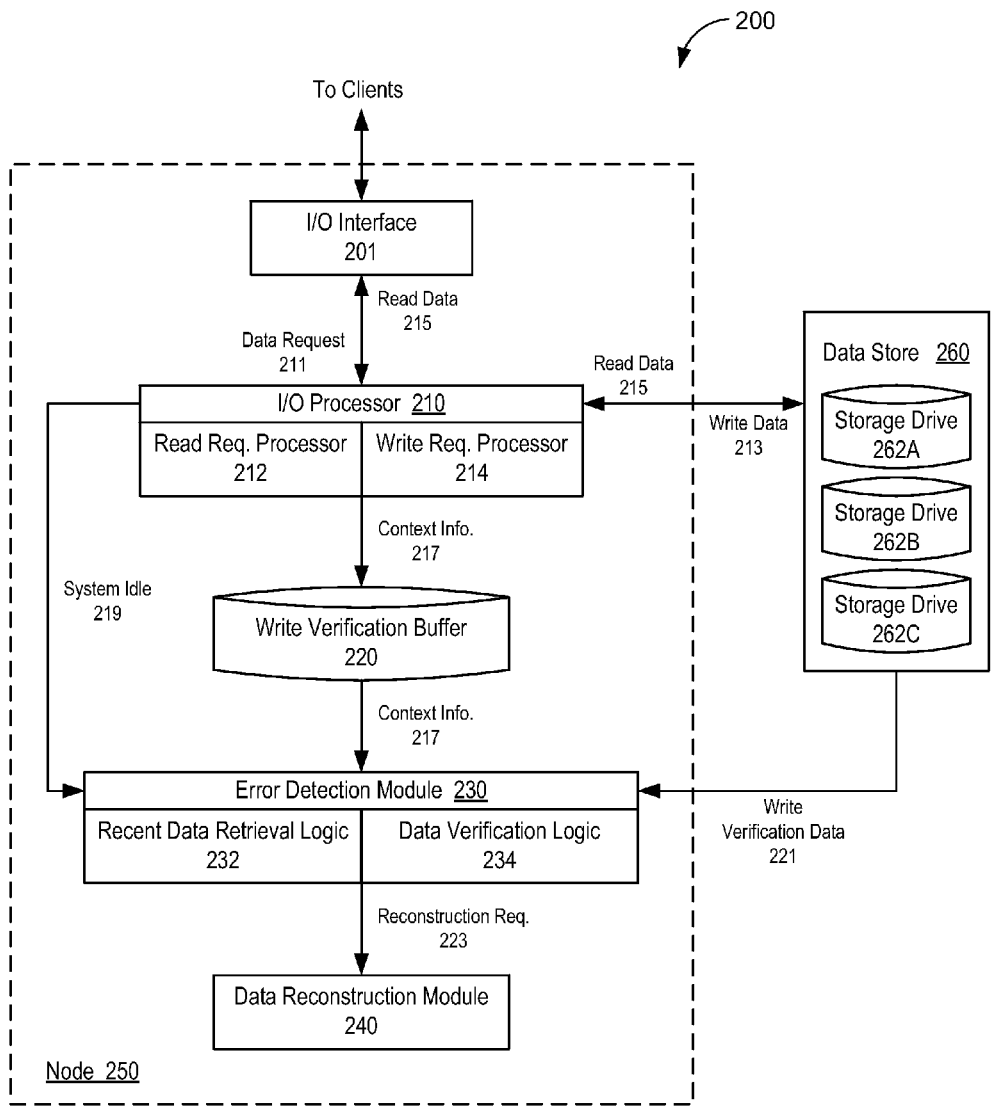
FIG. 2 illustrates a more detailed aspect of a data storage system with background write verification.

FIG. 2 illustrates a more detailed aspect of a data storage system 200 with background write verification. The data storage system 200 includes a node 250 and a data store 260. With reference, for example, to FIG. 1A, node 250 and data store 260 may correspond to node 110 and data store 120, respectively, of the data storage system 100. As described above, the node 250 may be a server on a network that is configured to provide access to the data store 260. The data store 260 includes a number of storage drives (or "disks") 262A-262C. Each storage drive 262A-262C may be, for example, a conventional magnetic disk (e.g., HDD), an optical disk (e.g., CD-ROM, DVD, Blu-Ray, etc.), a magneto-optical (MO) drive, and/or any other type of volatile or non-volatile medium suitable for storing large quantities of data.

In some aspects, the data store 260 is implemented as a redundant array of independent disks (RAID) storage system. In a RAID system, write data 213 is broken up into chunks that are distributed and stored across multiple storage drives 262A-262C. This technique (known as "striping") allows the I/O processor 210 to read large amounts of data from the data store 260 in parallel. For example, a RAID "stripe" may comprise a set of data blocks, wherein each block is stored on a different storage drive 262A, 262B, or 262C. Data blocks belonging to the same RAID stripe tend to be related physically (e.g., pertaining to the same file) and/or temporally (e.g., received or stored at substantially the same time).

The node 250 includes an I/O processor 210, a write verification buffer 220, an error detection module 230, and a data reconstruction module 240. An I/O interface 201 facilitates communications between the data storage system 200 and one or more client terminals (not shown). Specifically, the I/O interface 201 receives data access requests 211 specifying read and/or write operations to be performed on the data store 260. For example, the I/O interface 201 may support network-based protocols such as CIFS and/or NFS. In some instances, the I/O interface 201 may further provide read data 215 to the requesting client terminal in response to a data access request 211 (e.g., where the data access request 211 specifies a read operation).

The I/O processor 210 receives the data access requests 211 from the I/O interface 201 and performs corresponding read and/or write operations on the data store 260. More specifically, the I/O processor 210 may store write data 213 to, and/or retrieve read data 215 from, one or more of the storage drives 262A-262C. In some aspects, the I/O processor 210 includes a read request processor 212 and a write request processor 214. The read request processor 212 responds to data access requests 211 (corresponding to read operations) by retrieving read data 215 from one or more storage locations of the storage drives 262A-262C indicated the request 211. The write request processor 214 responds to data access requests 211 (corresponding to write operations) by first generating a set of context information 217 for the write data 213 provided with the request 211. As described above, the context information may include a checksum, an inode, an FBN, a generation count, and/or additional metadata. The write request processor 214 then stores the write data 213 (e.g., along with the context information) in one or more storage locations of the storage drives 262A-262C.

Further, each time the I/O processor 210 stores a block of write data 213 in the data store 260, a copy of the corresponding context information 217 is stored in the write verification buffer 220. In some aspects, the write verification buffer 220 may be implemented as a FIFO-type circular buffer. For example, the oldest entries in the write verification buffer 220 are the first to be read out and subsequently replaced (or overwritten) by a new set of context information 217. In this manner, the write verification buffer 220 is able to maintain a log of the context information for the most recently written data (wherein detected errors have the highest likelihood of being corrected).

The error detection module 230 uses the context information 217 stored by the data verification buffer 220 to check for errors in the recently-written data in the data store 260. In some aspects, the error detection module 230 performs write verification in the background (e.g., when the data store 260 is idle). For example, the error detection module 230 may monitor the I/O processor 210 to determine when it is not reading or writing data to the data store 120. In some aspects, the I/O processor 210 may assert an idle signal 219 when there is a pause in read/write operations. Upon detecting that the data store 260 is idle, the error detection module 230 may read a set of context information 217 from the write verification buffer 220. As described above, the context information 217 read out by the error detection module 230 may correspond to the oldest entry of the write verification buffer 220.

The error detection module 230 includes recent data retrieval logic 232 and data verification logic 234. The recent data retrieval logic 232 determines the storage location of a recently-written data block. For example, the storage location may by identified from the FBN provided with the context information 217 that is read from the write verification buffer 220. The error detection module 230 may then retrieve the data (i.e., write verification data 221), from the data store 260, stored at the location identified by the recent data retrieval logic 232. The data verification logic 234 compares the write verification data 221 with the context information 217 to check for any errors. For example, the data verification logic 234 may compute a checksum for the write verification data 221 and compare the computed checksum with the checksum value provided with the context information 217 to determine whether the write verification data 217 has been corrupted.

It should be noted that, in other aspects, the error detection module 230 may utilize various combinations of metadata, provided with the context information 217, to detect errors in the write verification data 221. In some aspects, write verification may also be implemented using inode information. For example, the Write Anywhere File-system Layout (WAFL) uses files to store metadata that describes the file system layout. Files in the WAFL file system are described by inodes that contain information about the owner (or creator) of a file, its location, permissions, size, access time, and/or additional file information. Thus, the inode may directly and/or indirectly reference (e.g., point to) the underlying data blocks of a file. Further, in some aspects, the generation count may be used to uniquely identify a write operation. For example, the generation count is typically implemented by a RAID layer to keep track of the number of times a particular data block has been written.

If the error detection module 230 determines that the write verification data 221 is corrupted, it may send a reconstruction request 223 (e.g., specifying the storage location and/or RAID stripe of the corrupted data block) to the data reconstruction module 240. The data reconstruction module 240 can then reconstruct the corrupted data, for example, using parity information stored in the storage drives 262A-262C. The corrupted data may be reconstructed using known storage device reconstruction techniques. In some aspects, the data reconstruction module 240 may be implemented in a RAID layer. As described above, write data 213 may be distributed across the storage drives 262A-262C, in RAID stripes, such that data blocks stored on one of the storage drives (e.g., storage drive 262A) are associated with data blocks stored on the other storage drives (e.g., storage drives 262B and 262C). For example, a RAID stripe may contain one data block from each of the storage drives 262A-262C, including a parity block from a parity drive (e.g., which may correspond to one of the storage drives 262A, 262B, or 262C). Thus, a corrupted data block on storage drive 262A can be reconstructed or recalculated based on the data and parity information stored on the remaining storage drives 262B-262C.

In some aspects, the data reconstruction module 240 may further verify one or more blocks of data surrounding a corrupted block. The surrounding blocks may include, for example, other data blocks in the same RAID stripe as the corrupted block and/or in one or more surrounding RAID stripes. As described above, data corruption typically results from errors while writing data to a storage medium. Such write-errors are therefore likely to propagate to any write data 213 stored in close proximity (i.e., physically and/or temporally) to the corrupted data. Thus, upon receiving a reconstruction request 223, the data reconstruction module 240 may use the data and parity information stored in the corresponding RAID stripe to detect and/or fix any additional errors. In some aspects, the data reconstruction module 240 may further verify the data stored in one or more RAID stripes that were written prior and/or subsequent to the RAID stripe containing the corrupted block.

Figure 3:
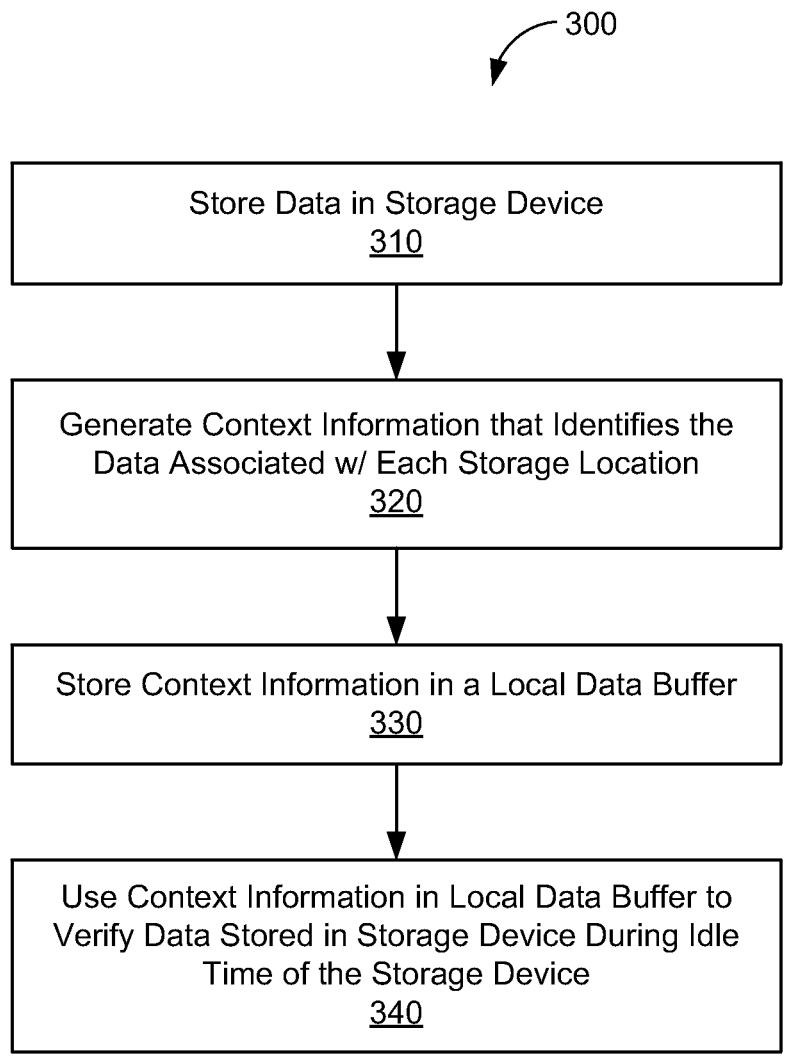
FIG. 3 illustrates a method for performing background write verifications, in accordance with some aspects.
Figure 4:
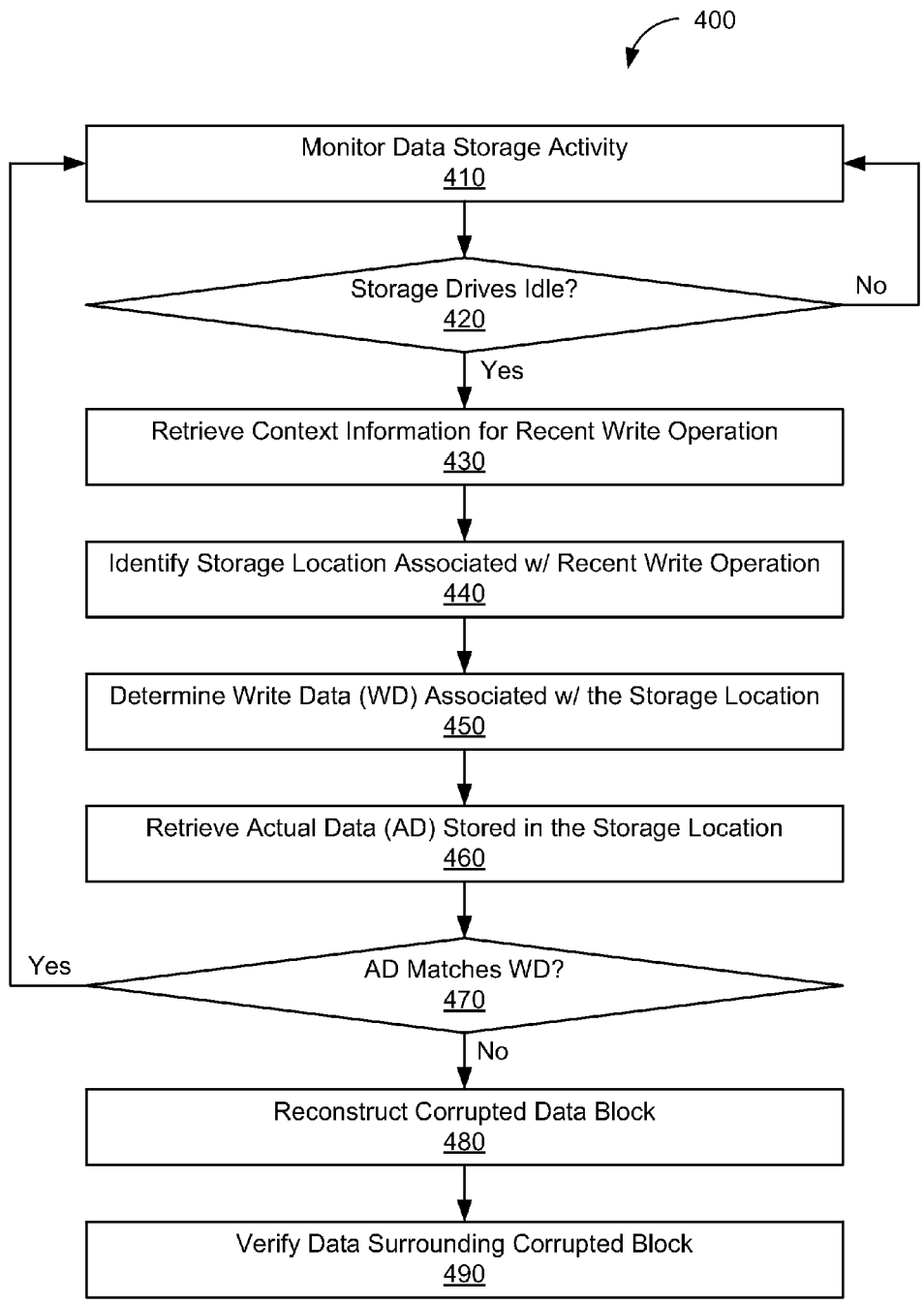
FIG. 4 illustrates a more detailed aspect of a method for performing background write verification.

FIGS. 3 and 4 illustrate methods for performing background write verification, in accordance with some aspects. Examples such as described with FIG. 3 and FIG. 4 can be implemented using, for example, a system such as described with FIGS. 1A and 2. Accordingly, reference may be made to elements of FIG. 1A and/or FIG. 2 for purpose of illustrating suitable elements or components for performing a step or sub-step being described.

FIG. 3 illustrates a method 300 for performing background write verifications, in accordance with some aspects. The method 300 may be implemented, for example, by node 110 described above with respect to FIG. 1A. The node 110 is coupled to a storage device (e.g., data store 120) and stores data in one or more storage locations of the storage device (310). For example, the I/O processor 112 may receive one or more data access request 151 specifying a write operation, wherein each data access request 151 includes a set of data to be written to a particular storage location in the data store 120. The I/O processor 112 may then store the received write data 113 in the corresponding storage location. In some aspects, the storage device 120 may correspond to a RAID storage system, wherein data is stored in stripes that span a plurality of storage drives (e.g., storage drives 262A-262C of data store 260, with reference to FIG. 2). Accordingly, the particular storage location in which the write data 113 is stored may be determined by a RAID layer executing on the data storage system 100.

The node 110 further generates a set of context information that identifies the data associated with (i.e., the data that is supposed to be written to) each storage location (320). For example, each time a block of write data 113 is stored in the data store 120, the I/O processor 112 may generate a corresponding set of context information 115 that identifies the write data 113 to be stored at a corresponding location in the data store 120. The context information 115 may include, for example, a checksum, an inode, a FBN, a generation count, and/or additional metadata which may be used to associate a block of data with a particular storage location (e.g., file identifier, volume block number, disk block number, etc.). In some aspects, the context information 115 is stored in the data store 12, along with the corresponding write data 113.

Further, a copy of the context information is stored in a local data buffer (330). For example, the local data buffer may be a storage device on the node 110 that is distinct and separate from the data store 120 (such as the write verification buffer 220, described above in respect to FIG. 2). In some aspects, the local data buffer may be implemented as a FIFO-type circular buffer. Thus, the oldest context information stored in the data buffer is the first to be read out. Once all of the storage locations of the data buffer have been written to, newly-generated context information may be stored in place of the oldest entries of the data buffer (e.g., assuming the context information stored therein has already been read out). However, in instances where the data buffer is full, the newest context information may overwrite the oldest context information stored in the data buffer.

The node 110 may then use the context information stored in the local data buffer to verify the data stored in the storage device during an idle time of the storage device (340). For example, the write verification module 114 may monitor the I/O processor 112 to determine when data is not being written to or read from the data store 120. Upon determining that the data store 120 is idle, the write verification module 114 may read out a set of context information 115 from the local data buffer (e.g., corresponding to the oldest entry in the data buffer), and compare the context information 115 with a corresponding block of data in the data store 120. More specifically, the write verification module 114 may identify a storage location in the data store 120 based on the metadata (e.g., inode, FBN, etc.) provided with the context information 115. The write verification module 114 may then retrieve a block of write verification data 115 stored at the identified storage location and compare it with additional metadata (e.g., inode, checksum, etc.) provided with the context information 115 to verify whether the actual data stored at that storage location matches the data that was intended to be stored there.

FIG. 4 illustrates a more detailed aspect of a method 400 for performing background write verification. The method 400 may be implemented, for example, by the error detection module 230 described above with respect to FIG. 2. The error detection module 230 monitors data storage activity (410) to determine when the storage drives of a corresponding storage device (e.g., storage drives 262A-262C of data store 260) are idle (420). For example, the error detection module 230 may monitor the I/O processor 210 to determine whether the I/O processor 210 is reading or writing data to the data store 260.

In some aspects, the I/O processor 210 may assert an idle signal 219 to indicate that the data store 260 is idle. As long as the storage drives are busy (420), the error detection module 230 may continue to monitor the data storage activity therein (410).

Once the error detection module 230 determines that the storage drives are idle (420), it may proceed by retrieving a set of context information associated with a recent write operation (430). For example, the error detection module 230 may read the context information 217 stored in the write verification buffer 220. In some aspects, the write verification buffer 220 is implemented as a FIFO-type circular buffer. Thus, the context information 217 read out by the error detection module 230 may correspond to the oldest entry of the write verification buffer 220.

The error detection module 230 identifies, from the context information, a storage location associated with the recent write operation (440). For example, the recent data retrieval logic 232 may determine the storage location of a recently-written data block based on metadata provided with the context information 217. In some aspects, the storage location can be identified from the FBN in the context information 217. In other aspects, the storage location can be identified from the inode data (e.g., file location) in the context information 217.

The error detection module 230 further determines the write data associated with the identified storage location (450). For example, the data verification logic 234 may determine the write data 213 that was originally supposed to be stored at the identified storage location based on metadata provided with the context information 217. It should be noted that the context information 217 does not include a complete copy of the write data. Nonetheless, the write data can be indirectly determined from (i.e., inferred and/or referenced by) the context information 217. In some aspects, the original write data can be identified from the checksum value in the context information 217. In other aspects, the original write data can be identified from the inode data (e.g., file size) in the context information 217.

The error detection module 230 then retrieves the actual data stored at the identified storage location (460) and compares it to the original write data that is supposed to be stored at that location (470). For example, the error detection module 230 may retrieve write verification data 221 from the storage location identified by the recent data retrieval logic 232. The data verification logic 234 may then compare the write verification data 221 with the original write data identified from the context information 217 to check for data corruption. In an aspect, the data verification logic 234 may compute a checksum for the write verification data 221 and compare it to the checksum provided with the context information 217. In other aspects, the data verification logic 234 may compare a file size of the write verification data 221 to the file size specified by the inode in the context information 217 (e.g., assuming the file size is smaller than that of a data block).

If the actual data matches the original write data (470), there are no detectable errors, and the error detection module 230 returns to monitoring data storage activity (410) to determine if and when a subsequent write verification operation can be performed. However, if there is a discrepancy between the actual data and the original write data (470), the error detection module 230 may trigger a data reconstruction operation to reconstruct the corrupted data stored at the identified storage location (480). For example, the error detection module 230 may send a reconstruction request 223 (e.g., specifying the storage location and/or RAID stripe of the corrupted data block) to the data reconstruction module 240 (e.g., which may be implemented by the RAID layer). The data reconstruction module 240 can then reconstruct the corrupted data using parity information stored in the storage drives 262A-262C. In some aspects, the data reconstruction module 240 may reconstruct the entire RAID strip that contains the corrupted block.

Finally, additional data verification may be performed on the data surrounding the corrupted block of data (490). For example, the surrounding data may include other data blocks in the same RAID stripe as the corrupted block and/or in one or more surrounding RAID stripes. In some aspects, upon receiving a reconstruction request 223, the data reconstruction module 240 may automatically check the entire RAID stripe (which contains the corrupted block) for errors, for example, using the data and parity information stored in the storage drives 262A-262C. Additionally, the data reconstruction module 240 may further verify the data stored in one or more RAID stripes that were stored in close proximity (i.e., physically and/or temporally) to the RAID stripe containing the corrupted data block.

Figure 5:
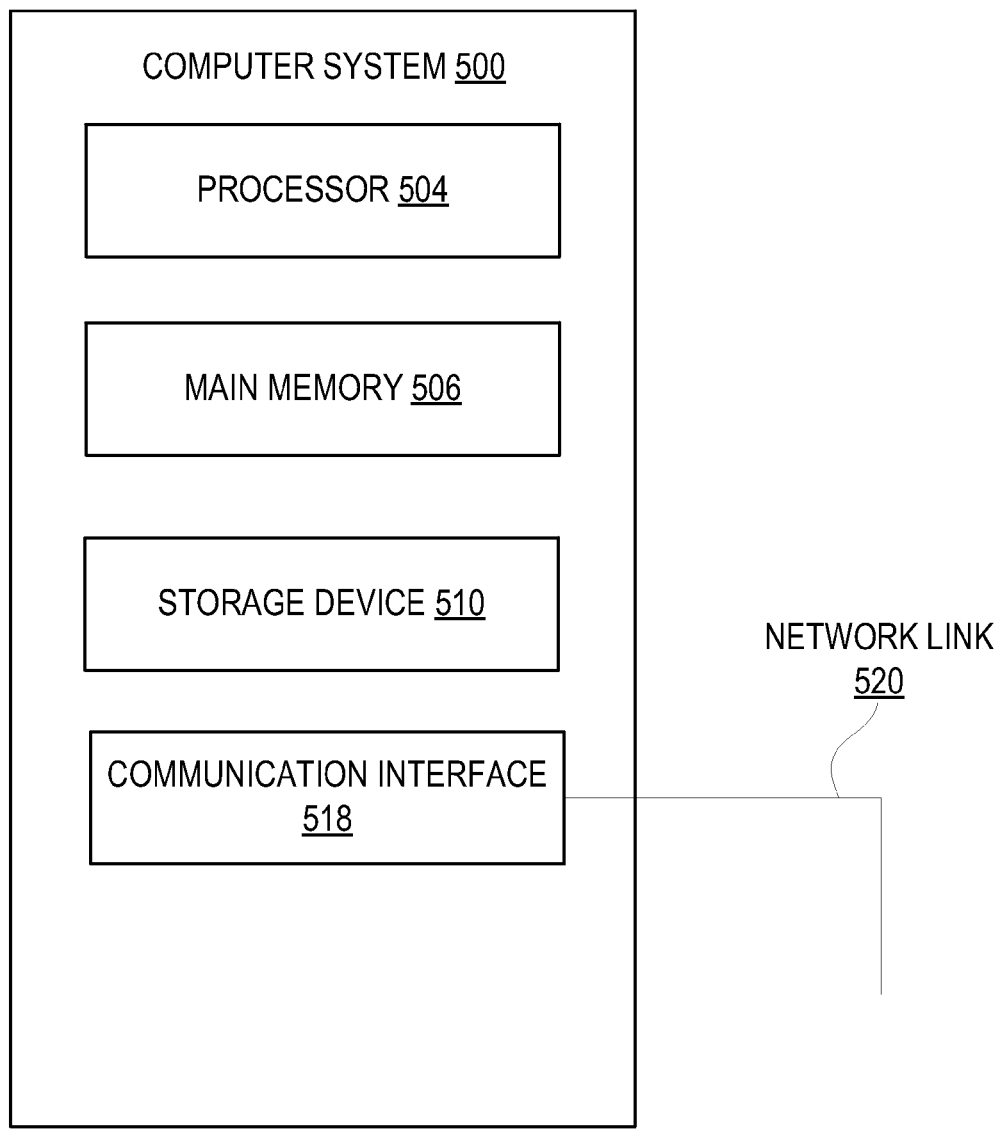
FIG. 5 is a block diagram that illustrates a computer system upon which aspects described herein may be implemented.

FIG. 5 is a block diagram that illustrates a computer system upon which aspects described herein may be implemented. For example, in the context of FIGS. 1A and 2, the data storage systems 100 and 200, respectively, may be implemented using one or more computer systems such as described by FIG. 5. More specifically, nodes 110 and 250 may also be implemented using one or more computer systems such as described with FIG. 5. Still further, methods such as described with FIGS. 3 and 4 can be implemented using a computer such as described with an example of FIG. 5.

In an aspect, computer system 500 includes processor 504, memory 506 (including non-transitory memory), storage device 510, and communication interface 518. Computer system 500 includes at least one processor 504 for processing information. Computer system 500 also includes a main memory 506, such as a random access memory (RAM) or other dynamic storage device, for storing information and instructions to be executed by processor 504. Main memory 506 also may be used for storing temporary variables or other intermediate information during execution of instructions to be executed by processor 504. Computer system 500 may also include a read only memory (ROM) or other static storage device for storing static information and instructions for processor 504. A storage device 510, such as a magnetic disk or optical disk, is provided for storing information and instructions. The communication interface 518 may enable the computer system 500 to communicate with one or more networks through use of the network link 520 (wireless or wireline).

In one implementation, memory 506 may store instructions for implementing functionality such as described with an example of FIGS. 1A and 2, or implemented through an example method such as described with FIGS. 3 and 4. Likewise, the processor 504 may execute the instructions in providing functionality as described with FIGS. 1A and 2 or performing operations as described with an example method of FIGS. 3 and 4.

Aspects described herein are related to the use of computer system 500 for implementing the techniques described herein. According to one aspect, those techniques are performed by computer system 500 in response to processor 504 executing one or more sequences of one or more instructions contained in main memory 506. Such instructions may be read into main memory 506 from another machine-readable medium, such as storage device 510. Execution of the sequences of instructions contained in main memory 506 causes processor 504 to perform the process steps described herein. In alternative aspects, hard-wired circuitry may be used in place of or in combination with software instructions to implement aspects described herein. Thus, aspects described are not limited to any specific combination of hardware circuitry and software.

Although illustrative aspects have been described in detail herein with reference to the accompanying drawings, variations to specific aspects and details are encompassed by this disclosure. It is intended that the scope of aspects described herein be defined by claims and their equivalents. Furthermore, it is contemplated that a particular feature described, either individually or as part of an aspect, can be combined with other individually described features, or parts of other aspects. Thus, absence of describing combinations should not preclude the inventor(s) from claiming rights to such combinations.

What is claimed is:

1. A method of storing data, the method comprising:
    storing data in one or more storage locations of a storage device;
    generating a checksum corresponding to the data and context information that identifies the data associated with each of the one or more storage locations, wherein the context information includes an index node and/or file block number;
    storing the context information with the data in the one or more storage locations;
    storing the checksum and the context information in a data buffer; and
    during an idle time of the storage device, (i) verifying integrity of the data written to the storage device using the checksum in the data buffer, and (ii) verifying that the written data is properly stored in the one or more storage locations by comparing the context information in the data buffer with the context information stored in the one or more storage locations.

2. The method of claim 1, wherein storing the data in the one or more storage locations comprises:
    storing a block of data in each of the one or more storage locations.

3. The method of claim 2, wherein generating the context information comprises:
    generating a set of context information for each block of data, wherein each set of context information identifies the block of data associated with a respective one of the one or more storage locations.

4. The method of claim 3, wherein the data buffer is a first-in first-out (FIFO) circular buffer, and wherein storing the context information in the data buffer comprises:
    storing each set of context information in the data buffer upon storing the corresponding block of data in the storage device; and
    overwriting an oldest entry in the data buffer with a most recent set of context information if the buffer is full.

5. A data storage system comprising:
    a memory containing machine readable medium comprising machine executable code having stored thereon;
    a processing module, coupled to the memory, to execute the machine executable code to:
        store data in one or more storage locations of a storage device;
        generate a checksum corresponding to the data and context information that identifies the data associated with each of the one or more storage locations, wherein the context information includes an index node and/or file block number;
        store the context information with the data in the one or more storage locations;
        store the checksum and the context information in a data buffer; and
        during an idle time of the storage device, (i) verify integrity of the data written to the storage device using the checksum in the data buffer, and (ii) verify that the written data is properly stored in the one or more storage locations by comparing the context information in the data buffer with the context information stored in the one or more storage locations.

6. The system of claim 5, wherein the processing module is to store the data in the one or more storage locations by storing a block of data in each of the one or more storage locations.

7. The system of claim 6, wherein the processing module is to generate the context information by generating a set of context information for each block of data, wherein each set of context information identifies the block of data associated with a respective one of the one or more storage locations.

8. The system of claim 7, wherein the data buffer is a FIFO circular buffer, and wherein the processing module is to store the context information in the data buffer by:
    storing each set of context information in the data buffer upon storing the corresponding block of data in the storage device; and
    overwriting an oldest entry in the data buffer with a most recent set of context information if the buffer is full.

9. A non-transitory computer-readable medium for implementing data storage, the computer-readable medium storing instructions that, when executed by one or more processors, cause the one or more processors to perform operations that include:
    storing data in one or more storage locations of a storage device;
    generating a checksum corresponding to the data and context information that identifies the data associated with each of the one or more storage locations, wherein the context information includes an index node and/or file block number;
    storing the context information with the data in the one or more storage locations;
    storing the checksum and the context information in a data buffer; and
    during an idle time of the storage device, (i) verifying integrity of the data written to the storage device using the checksum in the data buffer, and (ii) verifying that the written data is properly stored in the one or more storage locations by comparing the context information in the data buffer with the context information stored in the one or more storage locations.

10. The non-transitory computer-readable medium of claim 9, wherein the instructions for storing the data in the one or more storage locations include instructions for:
    storing a block of data in each of the one or more storage locations.

11. The non-transitory computer-readable medium of claim 10, wherein the instructions for generating the context information include instructions for:
    generating a set of context information for each block of data, wherein each set of context information identifies the block of data associated with a respective one of the one or more storage locations.

12. The non-transitory computer-readable medium of claim 11, wherein the data buffer is a FIFO circular buffer, and wherein the instructions for storing the context information in the data buffer include instructions for:
  storing each set of context information in the data buffer upon storing the corresponding block of data in the storage device; and
  overwriting an oldest entry in the data buffer with a most recent set of context information if the buffer is full.

* * * * *